(12) United States Patent
Marley

(10) Patent No.: US 8,459,848 B2
(45) Date of Patent: Jun. 11, 2013

(54) HEADLAMP ASSEMBLY FOR REMOVING WATER BASED CONTAMINATION

(75) Inventor: Michael Marley, Erie, PA (US)

(73) Assignee: Truck-Lite Co., LLC, Falconer, NY (US)

( * ) Notice: Subject to any disclaimer, the term of this patent is extended or adjusted under 35 U.S.C. 154(b) by 216 days.

(21) Appl. No.: 13/024,323

(22) Filed: Feb. 9, 2011

(65) Prior Publication Data

US 2012/0201031 A1    Aug. 9, 2012

(51) Int. Cl.
*F21V 33/00*    (2006.01)
*F21V 3/00*    (2006.01)

(52) U.S. Cl.
USPC ............. 362/521; 362/92; 362/507; 362/509; 362/520; 362/457

(58) Field of Classification Search
USPC ................. 362/507, 520, 521, 92, 509, 457
See application file for complete search history.

(56) References Cited

U.S. PATENT DOCUMENTS

| | | | |
|---|---|---|---|
| 1,925,423 A | 9/1933 | Warhus | |
| 1,951,902 A | 3/1934 | Dempsey | |
| 3,364,381 A | 1/1968 | Porter | |
| 4,728,775 A | 3/1988 | Van Straten | |
| 5,182,432 A | 1/1993 | Lange et al. | |
| 6,254,259 B1 | 7/2001 | Kobayashi | |
| 6,371,635 B2 | 4/2002 | Ott et al. | |
| 6,563,086 B1 | 5/2003 | Meirndorf et al. | |
| 6,601,983 B1 | 8/2003 | Runfola et al. | |
| 6,910,794 B2 | 6/2005 | Rice | |
| 7,195,365 B2 | 3/2007 | Suda et al. | |
| 7,262,388 B2 | 8/2007 | Moreth et al. | |
| 7,300,191 B2 | 11/2007 | Oshio et al. | |
| 7,410,267 B2 | 8/2008 | Mochizuki | |
| 7,505,268 B2 | 3/2009 | Schick | |
| D592,330 S | 5/2009 | Huang | |
| 7,537,366 B2 | 5/2009 | Inoue et al. | |
| 7,553,053 B2 | 6/2009 | Mochizuki | |
| 7,855,449 B2 | 12/2010 | De Graff et al. | |
| 7,883,251 B2 | 2/2011 | Ansari et al. | |
| 8,258,444 B2 * | 9/2012 | Ohtani et al. | .................. 219/552 |
| 2006/0011598 A1 | 1/2006 | Yasuda | |
| 2006/0113236 A1 | 6/2006 | Dahlgren et al. | |
| 2006/0176699 A1 | 8/2006 | Crunk | |
| 2006/0278803 A1 | 12/2006 | Mochizuki | |
| 2007/0181565 A1 | 8/2007 | Murahashi et al. | |
| 2008/0025038 A1 | 1/2008 | Chiang | |
| 2008/0265789 A1 | 10/2008 | Bertram et al. | |
| 2009/0196054 A1 | 8/2009 | Cheng | |
| 2009/0213613 A1 | 8/2009 | Mitic et al. | |
| 2010/0008099 A1 | 1/2010 | Inoue et al. | |

FOREIGN PATENT DOCUMENTS

GB    2334571 A    8/1999

* cited by examiner

*Primary Examiner* — Stephen F Husar
*Assistant Examiner* — James Cranson, Jr.
(74) *Attorney, Agent, or Firm* — The Bilicki Law Firm, P.C.; Rebecca MK Tapscott

(57) ABSTRACT

A headlamp assembly having a mechanism for reducing water based contamination is disclosed. The mechanism includes a lens assembly having an outer lens and an inner lens. A heating element may be disposed between the inner and outer lenses. Alternatively, inner and outer lenses may be spaced apart having a passage formed therebetween thorough which fluid may travel. Heat from light emitting diodes and a circuit board may be directed toward the outer lens through passages formed in the headlamp assembly.

10 Claims, 12 Drawing Sheets

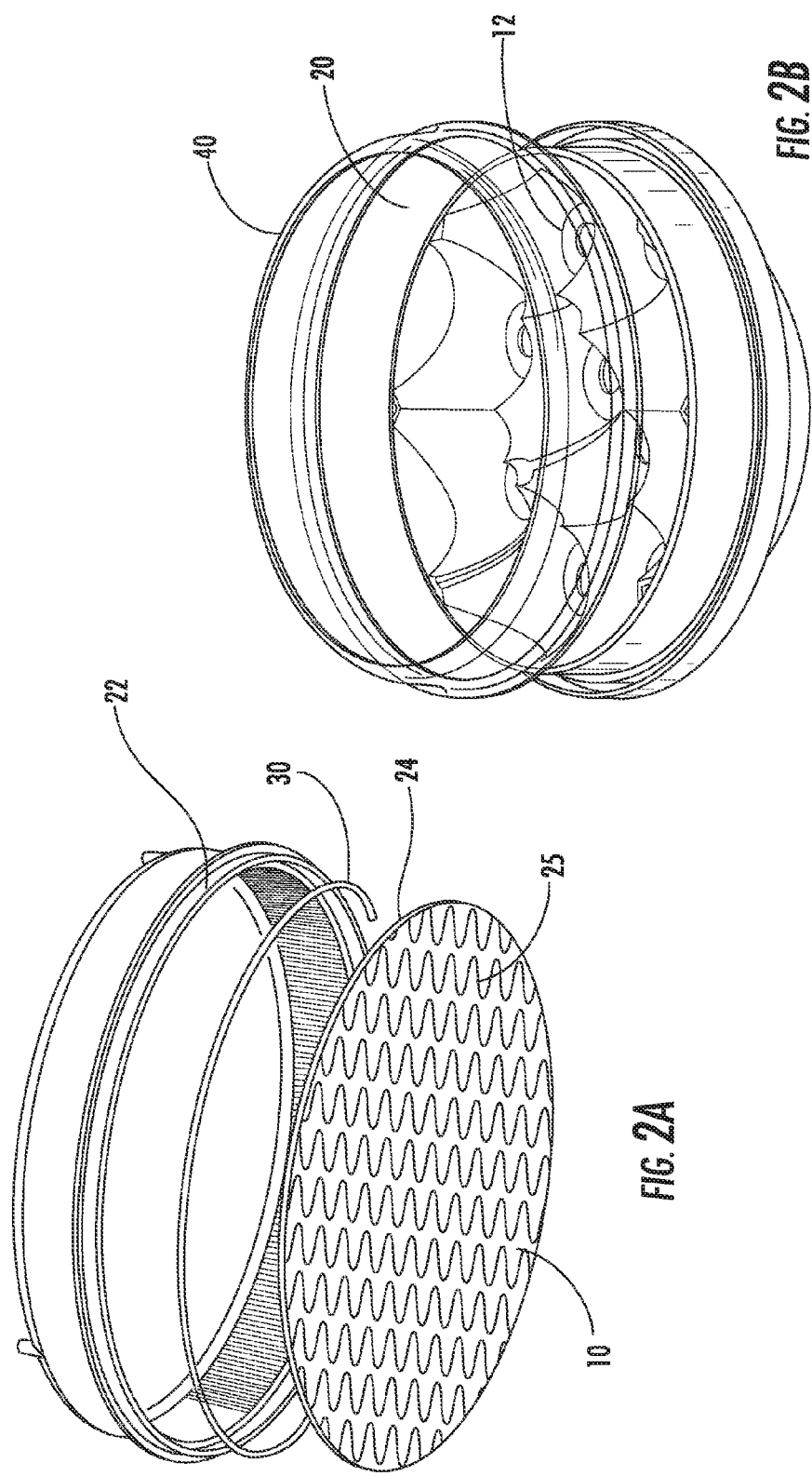

US 8,459,848 B2

HEADLAMP ASSEMBLY FOR REMOVING WATER BASED CONTAMINATION

SUMMARY

Embodiments disclosed herein relate generally to a lighting system which comprises a means for removing and/or preventing water based contamination from forming or accumulating on areas of an optical lens used in conjunction with a light emitting diode (LED) lamp.

A mechanism for reducing water based contamination in a headlamp assembly is provided. The mechanism uses some of the heat created by a LED emitter or other heat-generating devices within the headlamp assembly, to heat the lens area of a LED lamp. Thus, the heat prevents build-up of water-based contamination in the form of snow or ice on the lens, and heat is drawn away from the heat-generating devices, thereby extending the useful life of a LED circuit and emitter which may deteriorate prematurely when exposed to elevated temperatures generated by the LED and associated components.

In addition, one or more resistive heating elements, in the interior of the headlamp may be utilized in conjunction with heat radiating from the LED in order to remove water-based contamination from a LED lamp assembly. An optically-clear thermal transfer fluid may be utilized in the interior of a LED lamp to heat the lens structure in order to prevent accumulation of water-based contamination on the LED lamp.

BRIEF DESCRIPTION OF THE DRAWINGS

FIG. 2A is an exploded view of a lens assembly for a headlamp assembly.

FIG. 2B is an exploded view of the LED lamp shown in FIG. 1.

FIG. 3A shows an exploded view of an embodiment a lens assembly with a resistor there between.

FIG. 9 shows a method of embedding a wire in a polycarbonate lens structure.

DETAILED DESCRIPTION OF REPRESENTATIVE EMBODIMENTS

Figure 1:
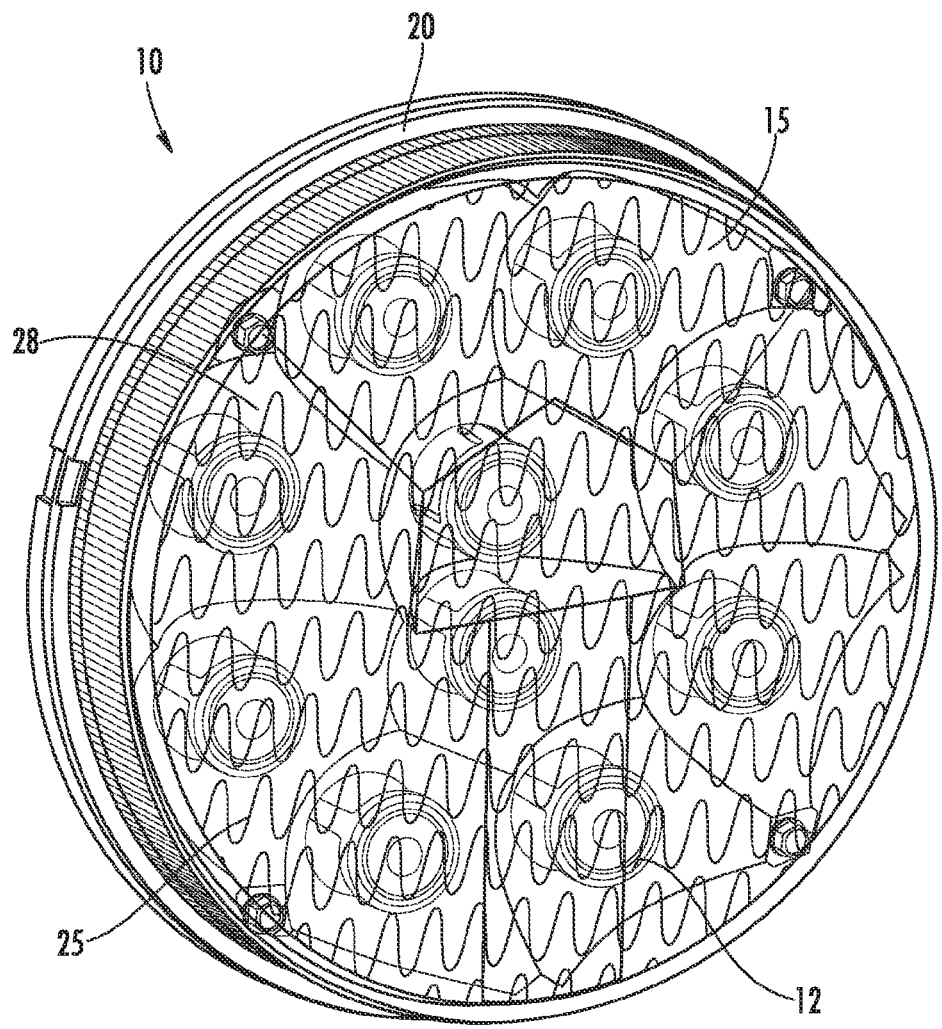
FIG. 1 shows an assembled front view of one embodiment of a LED lamp assembly.

For purpose of promoting an understanding of embodiments described herein, references are made to embodiments of a vehicle light emitting diode (LED) headlamp assembly and method of making only some of which are illustrated in the drawings. It is nevertheless understood that no limitations to the scope of any embodiments disclosed are thereby intended. One of ordinary skill in the art will readily appreciate that modifications such as the component geometry and materials, the positioning of components, type of heating and control devices, and the type of electrical connections do not depart from the spirit and scope of any embodiments disclosed herein. Some of these possible modifications are mentioned in the following description. Furthermore, in the embodiments depicted, like reference numerals refer to identical structural elements in the various drawings.

A headlamp assembly 10 in accordance with an embodiment of the invention is illustrated in FIG. 1. In the embodiment illustrated, headlamp assembly includes a plurality of light emitting diodes, one of which is indicated at 12. Those of skill in the art will appreciate that the quantity of Light emitting diodes depicted should not be construed as limiting, in that more or less Light emitting diodes may be utilized depending on the application of the headlamp. Headlamp assembly 10 includes a lens assembly 15 and a housing 20. Lens assembly 15 is formed of a material that prevents Light emitting diodes 12 from being exposed to the outside environment. For example, lens may be formed of polyester, polycarbonate, or glass. In addition, lens assembly 15 may be a single or dual lens structure, which will be described in detail below. In the embodiment shown in FIG. 1, heating elements 25 are incorporated into lens assembly 15 for assisting in the removal of water based contamination.

FIG. 2A is an exploded view of a lens assembly 9 for a headlamp assembly 10. An inner lens layer 14 and an outer lens layer 15, which includes side perimeter 16 terminating at ledge 22, are shown along with sealing element 31. A resistive element 25 is installed between inner lens layer 14 and outer layer 15 using an optically clear acrylic based pressure sensitive adhesive as a filler and bonding agent. Inner and outer lenses (14, 15) may be formed of polycarbonate, polyester, polyester, or glass.

FIG. 2B is an exploded view of a headlamp assembly 10, of one embodiment which comprises a circuit board, light emitting diodes 12, housing 26, an inner and outer lenses joined by adhesive to form lens assembly. The lens assembly of FIG. 2A attaches to housing 26 to form headlamp assembly 10.

Figure 3A:
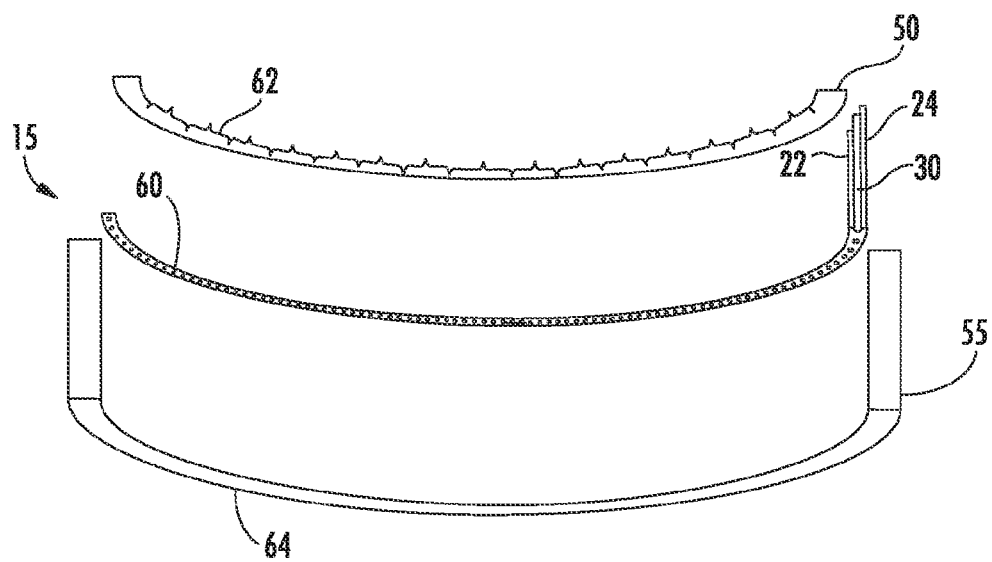

FIG. 3a is an exploded view of an embodiment of lens assembly 15 for use with headlamp assembly 10. As depicted, lens assembly 15 is a composite lens including inner lens 50 and outer lens 55 with resistive heating element 60 positioned therebetween. Inner and outer lens layers 50 and 55 may be formed of an optical grade material, such as polycarbonate or glass. An adhesive material of an optical grade, i.e. an acrylic based adhesive, is applied on upper and lower sides of heating element 60, which is an electrically resistive element having a small enough diameter that it does not interfere with the optical performance of lens assembly 15. By way of example, suitable alternative adhesives include thermally-activated or thermosetting adhesives, hot melt, chemically-activated adhesives such as those utilizing cross-linking agents, UV-activated light curing materials (LCM), encapsulated adhesives, and the like. Thus, lens assembly 15 is manufactured to fit together with sufficient precision as to have the same effect as a single layer lens. To accomplish this, the index of refraction of each material used in the lens assembly must be known in addition to the geometry. Then, modifications to the geometries of each lens layer may be considered to ensure starting and ending light path of light rays passing through lens assembly 15 matches that of a single layer lens that lens assembly 15 is replacing. The index of refraction for all points of interest across the lens surfaces may be determined using the following equation:

$$\sin\alpha_{resul} = \frac{n_{incid}}{n_{resul}} \sin\alpha_{incid}$$

Wherein:
- $\square_{resul}$ is the angle between a ray that has passed through a surface from one media to another and the normal line at the point on the surface where the ray passes through
- $\square_{incid}$ is the refractory index of the material that the ray is traveling within as it approaches an interface surface between two media.
- $\square_{resul}$ is the refractory index of the material that the ray passes into once it crosses the interface surface between two media.
- $\square_{incid}$ is the angle between a ray as it approaches a surface between one media and another and the normal line at point on the surface where the ray passes through.

Heating element 60 may be formed of copper or other base material that would operate within the voltage and current limitations necessary for removing water based contamination from lens assembly 15. For example, heating element 60 may operate at a voltage of 12-24 VDC/VAC. A maximum power of 0.1255 Watts/cm² lens area may also be applied. More particularly, heating element 60 may have specific resistance as determined by the required power density, operating voltage, and specific lens area in order for heating element 60 to be capable of removing an average of 3.095 milligrams of ice/cm² of lens area/minute over a maximum 30 minute duration when headlamp assembly 10 has been held at −35 C for a period not shorter than 30 minutes in an environment chamber with the environment chamber fully active for both 30 minute durations. The total power (in watts) can be determined by multiplying the effective area of lens assembly 15 required to be cleared of water based contamination (in cm²) times the power per lens area. Thus, resistance of the heating element 60 is dependent upon the type of material used to make resistive heating element 60, as well as its diameter.

In some embodiments resistive heating element 30 may be formed by depositing a layer of indium tin oxide (ITO) metal film on a polyester sheet, such as manufactured by Minco®. The diameter of heating element 60 may be in the range of 10 to 20 microns. In one embodiment, heating element 60 is configured in a pattern and disposed between two sheets of polyester, such as Thermal-Clear™. In some alternate embodiments heating element 60 may be formed by depositing a layer of indium tin oxide (ITO) metal film on a polyester sheet, such as manufactured by Minco®. In addition, the material used to make heating element 60 may be copper or a transparent conducting oxide such as indium tin oxide (ITO), fluorine-doped tin oxide (FTO), and doped zinc oxide or other similarly conductive and optically transparent materials.

Figure 3B:
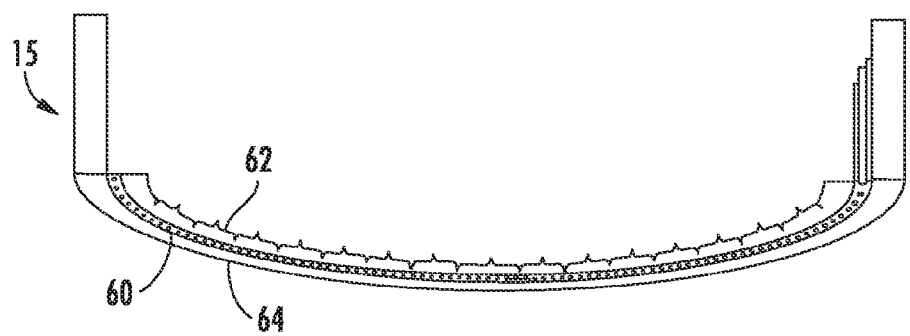
FIG. 3B shows an assembled view of the lens assembly of FIG. 3A.

Lens assembly 15 is shown in an assembled configuration in FIG. 3b. In one embodiment, lens assembly 15 is formed by laying heating element 60 in a pressure sensitive adhesive material using a robotic fixture device or other controllable/repeatable means capable of placing heating element 60. Heating element 60, containing adhesive, is then sandwiched between lens layers, 50 and 55, which are pressed together using a clamp, ram, vice, or other means of applying a clamping force to lens assembly 15 by contacting an inner surface 62 of inner lens 50 and an outside surface 63 of outer lens 55 with compliant interfaces (rubber blocks, etc). The compliant interfaces may be shaped such that they contact center portions of inner and outer lenses, 50 and 55, prior to deforming to make contact with the remainder of inner surface 62 and outer surface 64 for the purpose of dispelling air and other entrapped gases.

Alternatively, heating element 60 or wire may be embedded within a lens via an ultrasonic procedure. Essentially, the procedure begins with determining a mounting location in the lens substrate. Next, a wire is threaded onto an embedding tool known as a sonotrode. The sonotrode aids in pressing the wire against the lens substrate, and comprises an ultrasonic transducer, which heats the wire by friction. The molecules of the polycarbonate substrate simultaneously vibrate very quickly, so that the lens material melts in the area of the aperture. Accordingly, the wire is embedded into the polycarbonate substrate by use of pressure and heat. A final step in the process entails connecting ends of the wire that are not embedded, to terminals on the lens substrate.

Figure 3C:
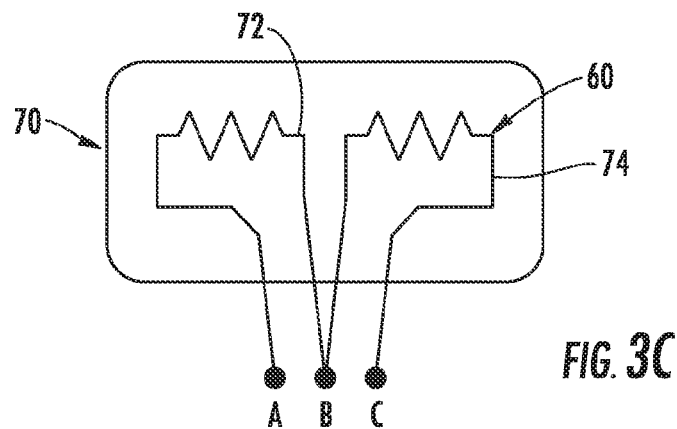
FIG. 3C is a schematic representation of a resistive heating element.

FIG. 3c shows a view of a circuit 70 used in one embodiment providing power to heating element 60. Circuit 70 comprises a resistive heating element 60 made from a thin wire, comprising any of various materials including copper, indium tin oxide (ITO), fluorine-doped tin oxide (FTO), and doped zinc oxide. Preferably, materials selected for heating element 60 should be optically transparent, and be capable of resisting fluctuations in current flow direction. Heating element 60 is configured as a pair of metallic or metallic oxide loops connected in parallel. A first loop 72 is connected to leads A and B. A second loop 74 is connected to leads B and C. The circuit construction allows for the use of either 24 volt or 12 volt systems at the same power level. Thus, for 24 volt operation, only leads A and C are utilized. For 12 volt operation, leads A and C are connected together to one pole and lead B to the other pole.

A simple control system 100 may be used to allow heating element 60 to operate automatically. Automatic or manual control logic would dictate that as long as the ambient temperature local to lens assembly is within temperature range wherein water based contamination may occur, heating element 60 is active (powered on). An automatic control system could be constructed of a comparator that switches heating element 60 on or off based on the resistance value of heating element 60 (which would vary with temperature). The resistance value may be compared to a set threshold resistance associated with a maximum temperature of the range wherein water based contamination may occur. Then, if the resistance value is at or below the threshold, the comparator switches to close the circuit providing power to heating element 60 and remains in that state. Conversely, if the resistance value is above the threshold resistance, the comparator switches to open the circuit disrupting power to the mechanism, which remains in an off state. The threshold value could be determined by calculation using the material properties of the resistive element, adhesive, and lens material and geometries and verified through empirical testing or just determined through empirical testing. Alternatively, the control system may use a separate electronic temperature indicating device. The control system could simply be a switch that is operated manually, it could be controlled by a programmable logic controller, or other means of switching the device on/off, or the device could be left on all the time.

Figure 4A:
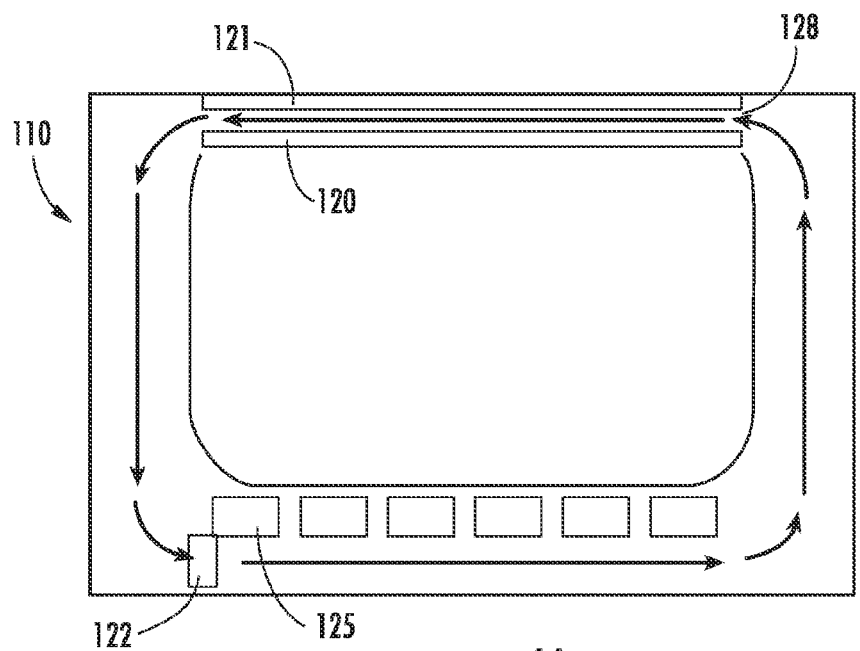
FIG. 4A is a schematic representation of another embodiment of a mechanism for reducing water based contamination from a headlamp assembly.

FIG. 4A is a schematic representation of another embodiment of a mechanism 110 for reducing water based contamination from a headlamp assembly 10. Mechanism 110 includes inner and outer lenses 120 and 121 and an energy source that dissipates energy in the form of heat. The energy source may be light emitting diodes 125, or any other part that dissipates energy in the form of heat either by mechanic or electrical principles. An optically clear fluid, in gaseous or liquid form, is directed past energy sources (Light emitting diodes 125) with a mechanically or electrically operated pump, fan, compressor or the like. In the embodiment shown, a fan 122 is used to circulate the fluid. Free convection may also be used to transfer heat energy from energy sources 125 to mass particles contained in the fluid, which is then directed through a channel 128 between inner lens 120 and outer lens 121. Heat energy is then transferred from the fluid mass particles to lenses 120 and 121 such that accumulation of water based contamination cannot occur. The heat energy also removes any previously accumulated water based contamination from lenses 120 and 121. Mechanism 110 may be used alone or in conjunction with another device, such as a heating element, in order to provide sufficient energy to lenses 120 and 121. The fluid may be channeled using existing geometries within lens assembly 15 and additional geometries may be added to provide passages for the fluid. The fluid may be partly or completely encapsulated or free flowing against lenses 120 and 121. In the embodiment illustrated in FIG. 4a, channel 128 facilitates the transfer of cool air originating from outer lens 121, which is exposed to the outside of the headlamp, toward light emitting diodes 125 in order to decrease the temperature of light emitting diodes 125. Thus, mechanism 110 provides a means of distributing heated and cooled fluid within headlamp assembly 10. It will be appreciated by those of skill in the art that the "fluid" as used herein may comprise liquid, gaseous substances, including air or other vapors, free-flowing polymeric fluids, partially or completely encapsulated fluids, as well as fluids comprising mass particles. Representative heat transfer fluids known in the art may also include polyolefins, polyalphaolefins, diphenylethanes, and the like, manufactured and sold by Radco®.

Figure 4B:
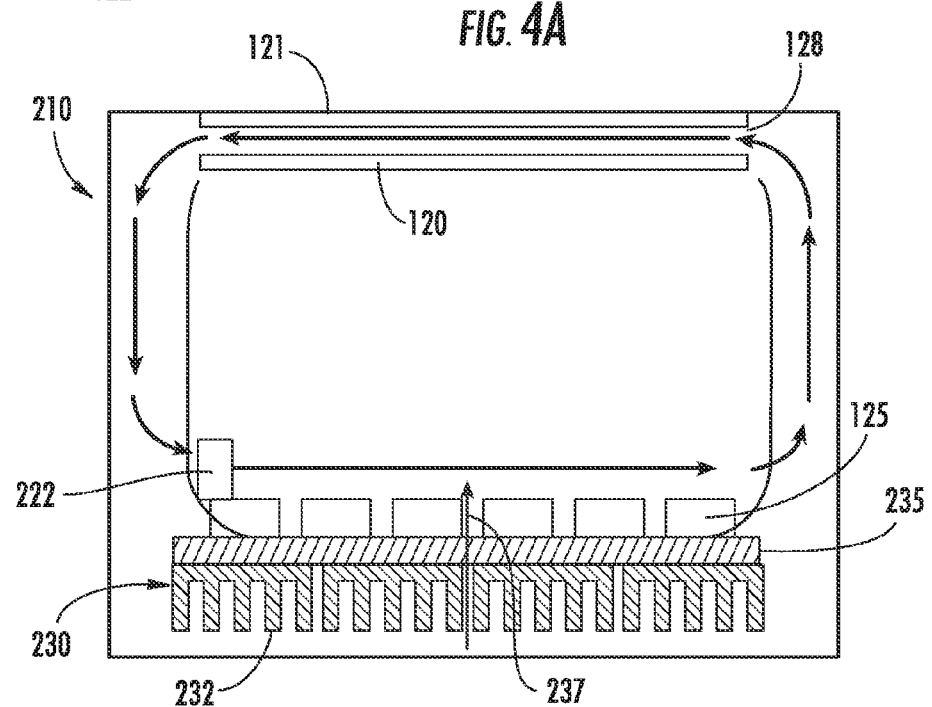
FIG. 4B schematic representation of another embodiment of a mechanism for reducing water based contamination from a headlamp assembly.

FIG. 4B is schematic representation of an embodiment of a mechanism 210 for reducing water based contamination from a headlamp assembly 10. Similar to the embodiment described in conjunction with FIG. 4a, mechanism 210 includes inner and outer lenses 220 and 221 having a channel 128 therebetween, a fan 222 and light emitting diodes 225 that dissipate energy in the form of heat. In addition, mechanism 210 includes a heat sink 230 having fins 232. A solid state heat pump 235, such as a Peltier device, may be inserted between heat sink 230 and light emitting diodes 125. When energized solid state heat pump 235 acts to reverse the direction of energy transfer to cause energy to flow from heat sink 230 to light emitting diodes 125, as indicated by arrow 237, under controlled conditions wherein light emitting diodes 125 would not become damaged due to overheating.

The transfer of heat towards light emitting diodes 125 may be used when the temperature local to mechanism 210 and light emitting diodes 125 is sufficiently low that the conditions are correct for water based contamination to develop or accumulate on outer lens 121. Heat pump 235 also increases the energy that is transferred from light emitting diode to the fluid, thereby more effectively providing energy to outer lens 121 for the purpose of removing water based contamination. Additional solid state heat pumps, or other types of heat pumps, may be used at other locations anywhere surrounding a fluid channel that is being used for the purpose of transferring energy as described above.

As is known in the art, Peltier heat pump 235, operates based on the Thomson Effect, which is based upon the principle that electric potential difference is proportional to temperature difference. Specifically, a thermal gradient is created when a temperature difference along a conductor is present such that one part of the conductor is warmer, while the other is colder. Thermal energy in the form of electrons, will inherently travel from the warmer portion of the conductor to the colder portion.

In terms of polarity, electrons normally travel from positive to negative. The Peltier Effect involves the discovery that when current flows through a circuit comprising two or more metals of varying electronic properties (ex, n-type vs. p-type), the current drives a transfer of heat from one junction to the other. However, when the polarity is reversed as is the case under an applied voltage, electrons will travel in the opposite direction (i.e., from negative to positive). Similarly, heat transfer will also occur in the opposite direction. Thus, the direction of heat transfer may be controlled by manipulating the polarity of current running through Peltier heat pump 235.

Heat created by light emitting diodes 125, circuit board (not shown in FIG. 4b), or other heat generating devices may be absorbed by heat sink 230. In order to prevent absorbed heat from being exhausted to the atmosphere via fins 232, heat pump 235 may be activated in order to transport heat from heat sink 230 to a channel located below the heat sink. In one embodiment, sensors may be utilized to monitor when the temperature of the fluid drops below a certain level, at which time a control circuit may activate heat pump 235 in order to transport stored heat from heat sink 230 to thereby promote circulation of heated fluid within mechanism 210. Heat sink 230, which collects and stores heat originating from heat generating devices. These heat generating devices may include Light emitting diodes, resistors, fans or air pumps, power electronics including but not limited to linear and switch mode current regulators, which may be required to drive or regulate power within the lamp. Essentially, heat sink 330 may collect heat from any device that creates heat within the lamp, whether or not it is the device's primary function to do so. Subsequently, heat collected by heat sink 330 may be exhausted to the atmosphere via fins 332.

Figure 5:
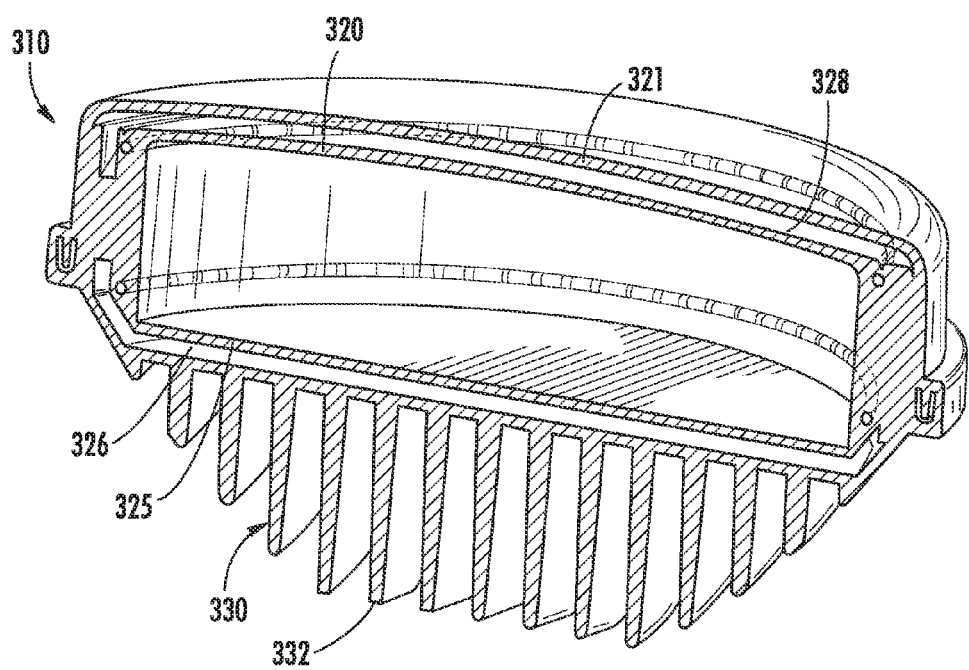
FIG. 5 illustrates a cross-sectional view a mechanism for reducing water based contamination from a headlamp assembly.

FIG. 5 illustrates a cross-sectional view a mechanism 310 for reducing water based contamination from a headlamp assembly 10. Mechanism 310 includes an inner lens 320 and outer lens 321 and heat sources, including light emitting diodes and a circuit board 325. A channel 326 is located below circuit board 325 for allowing the passage of fluid. As discussed above, heat generated by light emitting diodes and associated circuitry on circuit board 325 is transferred to channel 326 via a convection process. A channel 328 for transferring fluid is also located between inner and outer lenses 320 and 321. Subsequently, a portion of the heat transferred to channel 326, exits mechanism 310 via heat sink 330 having fins 332.

Figure 6A:
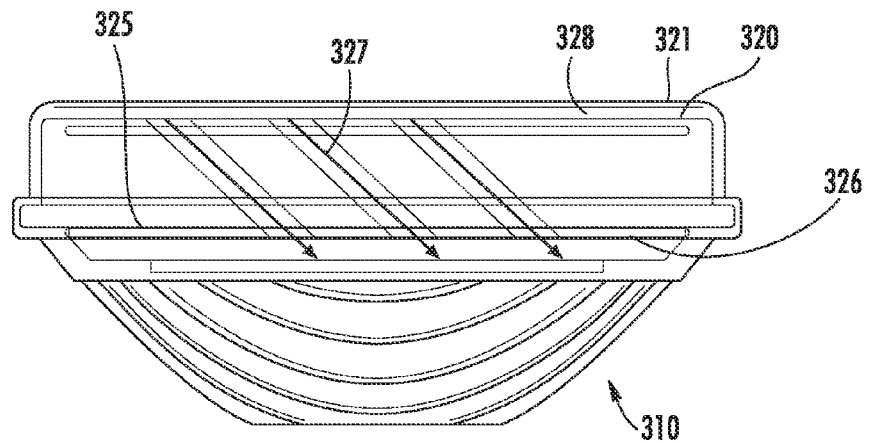
FIGS. 6A and 6B are cross-sectional views of a mechanism for reducing water based contamination from a headlamp assembly having side channels.
Figure 6B:
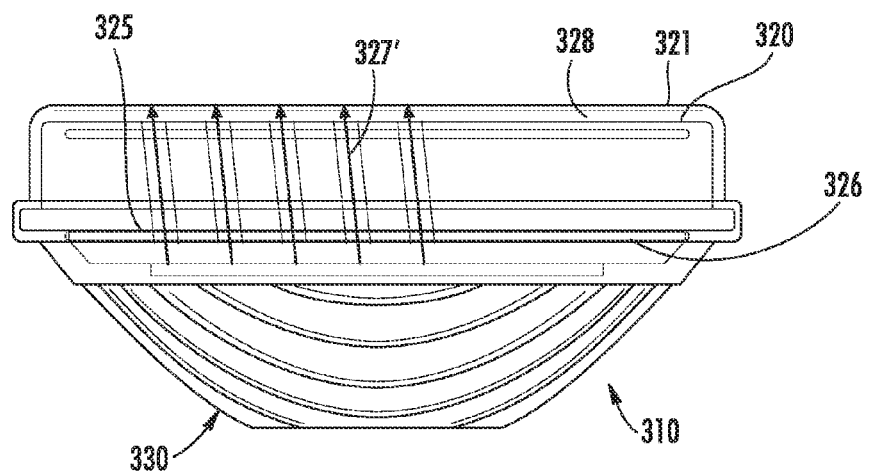

More specifically, a free-convection process may be utilized to circulate fluid between inner and outer lenses 320 and 321 in order to maximize melting of snow and ice from outer lens 321. In this embodiment, heat is transferred to fluid by use of geometries within the lens structure. The initial temperature of channel 328 is cold. Second fluid-flow channel 326 is located below circuit board 325 and facilitates absorbance of heat originating from circuit board 325. Thus, the initial temperature of channel 326 is hot. As illustrated in FIGS. 6a and 6b, side channels 327, 327' located in opposite side-walls of mechanism 310 connect channels 326 and 328. The channels may be formed at an angle in the range of 10 to 30 degrees, as in FIG. 6a, to an angle of approximately 120 to 150 degrees, as in FIG. 6b. Angled side channels 327, 327' as well as channels 326 and 328 represent a system of channels enabling heated fluid to flow within mechanism 310 via a free convection process enhanced by gravity, density, and buoyancy. This process optimizes fluid flow within the dual lens structure, brought about by absorption and desorption of heat as discussed infra.

Heated fluid located in channel 326, is inherently less dense than colder fluid located in channel 328. Gravitational acceleration creates a buoyant force causing colder, heavier fluid in channel 328 to move down to displace the warmer fluid in channel 326. As the cold fluid collects in channel 326, it absorbs heat from circuit board 325, light emitting diodes, and other heat-generating devices. As the fluid becomes warmer, viscous forces of the fluid are decreased and buoyant forces which encourage fluid flow are increased. Buoyant forces thus overtake the viscous forces of the fluid, and flow is commenced toward channels 328. Pressure within the side channels is minimized by optimizing the cross-sectional area of the channels so that cross-sectional area increases in the direction of desired fluid flow. Accordingly, fluid flow within the side channels is promoted in the direction of channel 328, and resisted in the direction of channel 326. Once the fluid reaches channel 328 its heat is desorbed by snow and ice accumulating on outer lens 321. This steady state process repeats itself continuously, until outer lens 321 is free from water-based contamination caused by cold outdoor temperatures.

Figure 7A:
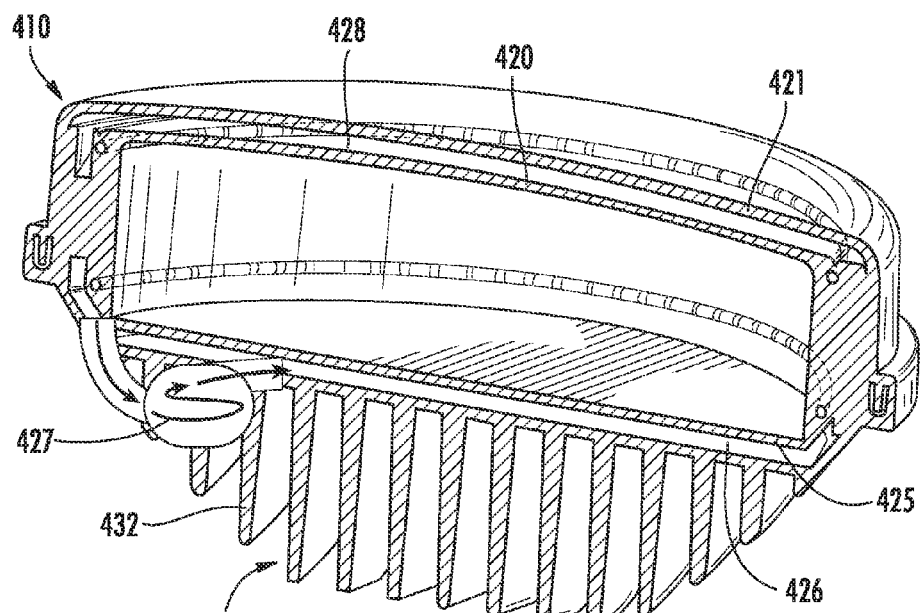
FIGS. 7a and 7b are cross-sectional views embodiments of a mechanism for reducing water based contamination from a headlamp assembly using a circulation system.

FIG. 7a is a cross-sectional view of another embodiment of a mechanism 410 for reducing water based contamination from a headlamp assembly 10. Mechanism 410 includes an inner lens 420 and outer lens 421 and heat sources, including light emitting diodes and a circuit board 425. A channel 426 is located below circuit board 425 for allowing the passage of air. As discussed above, heat generated by light emitting diodes and associated circuitry on circuit board 425 is transferred to channel 426 via a convection process. A circulation device such as fan 427 is provided to further encourage circulation of air within mechanism 410. A channel 428 for transferring fluid is also located between inner and outer lenses 420 and 421. Subsequently, a portion of the heat transferred to channel 426, exits mechanism 410 via heat sink 430 having fins 432.

Figure 7B:
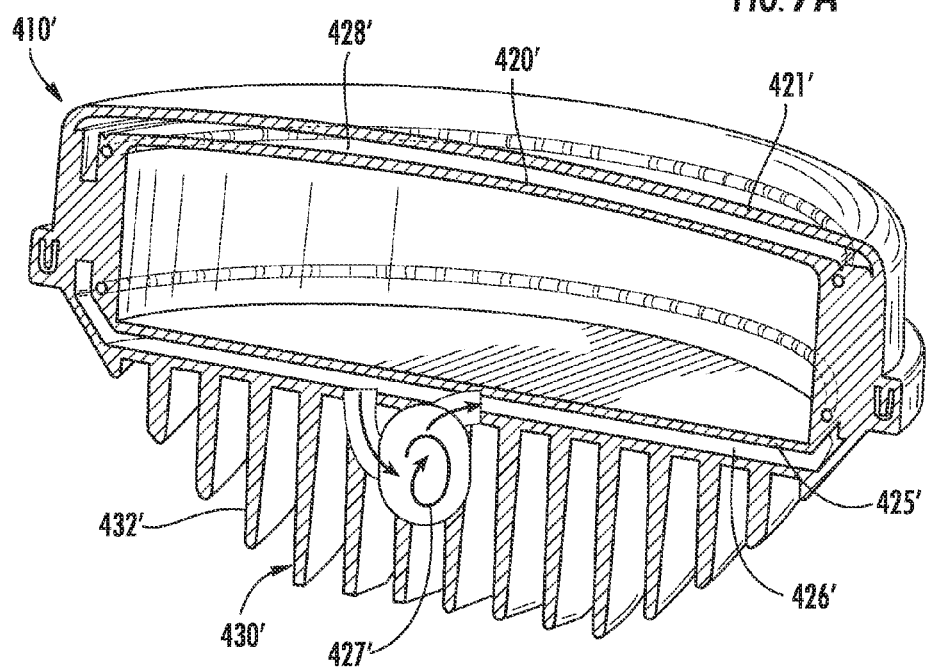

FIG. 7b is a cross-sectional view of mechanism 410' wherein a liquid is circulated within channels 426' and 428'. As discussed above the liquid may be a heat transfer fluid known in the art such as polyolefins, polyalphaolefins, diphenylethanes, and the like. A pump 427' is provided to circulate the liquid within mechanism 410.

Figure 8A:
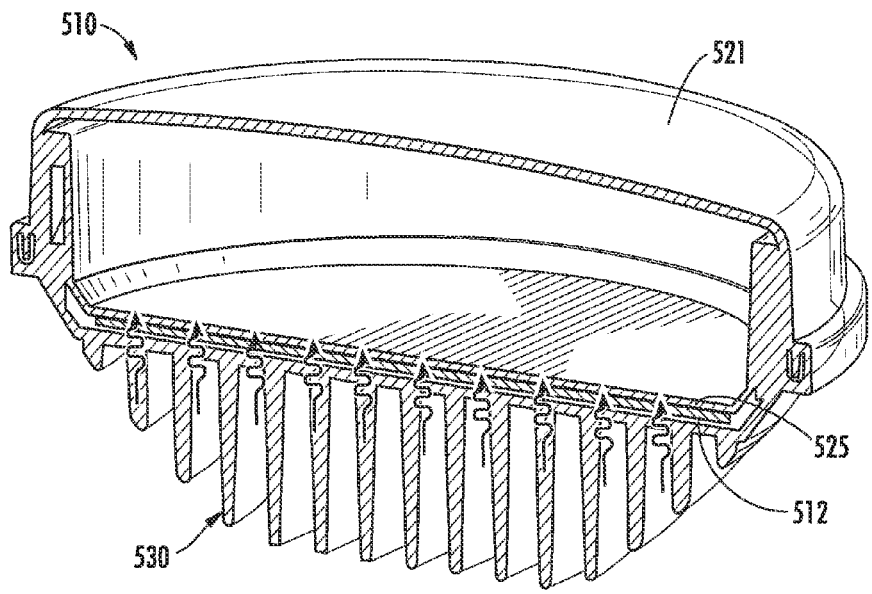
FIGS. 8a, 8b, and 8c are cross-sectional view of a mechanism for reducing water based contamination from a headlamp assembly including a solid state heat pump.
Figure 8B:
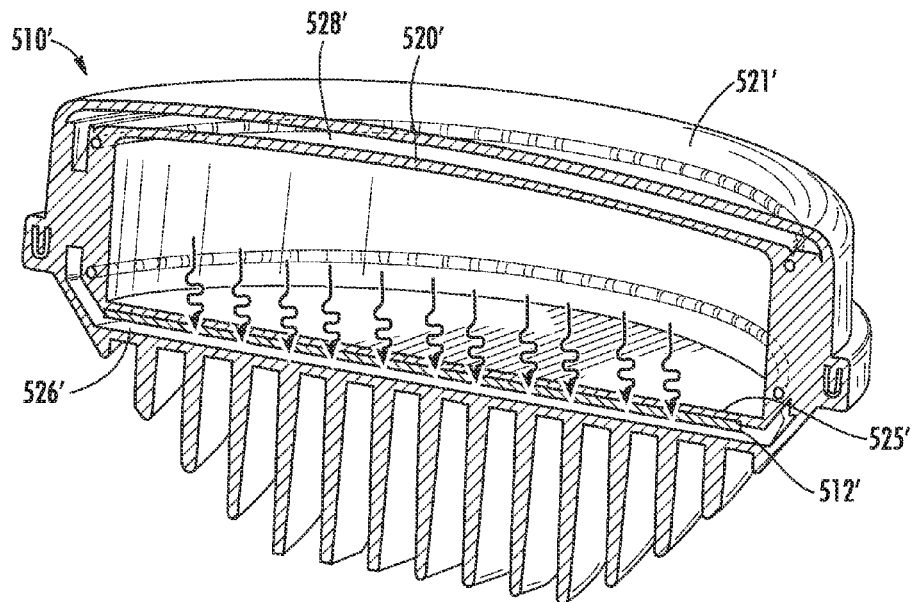
Figure 8C:
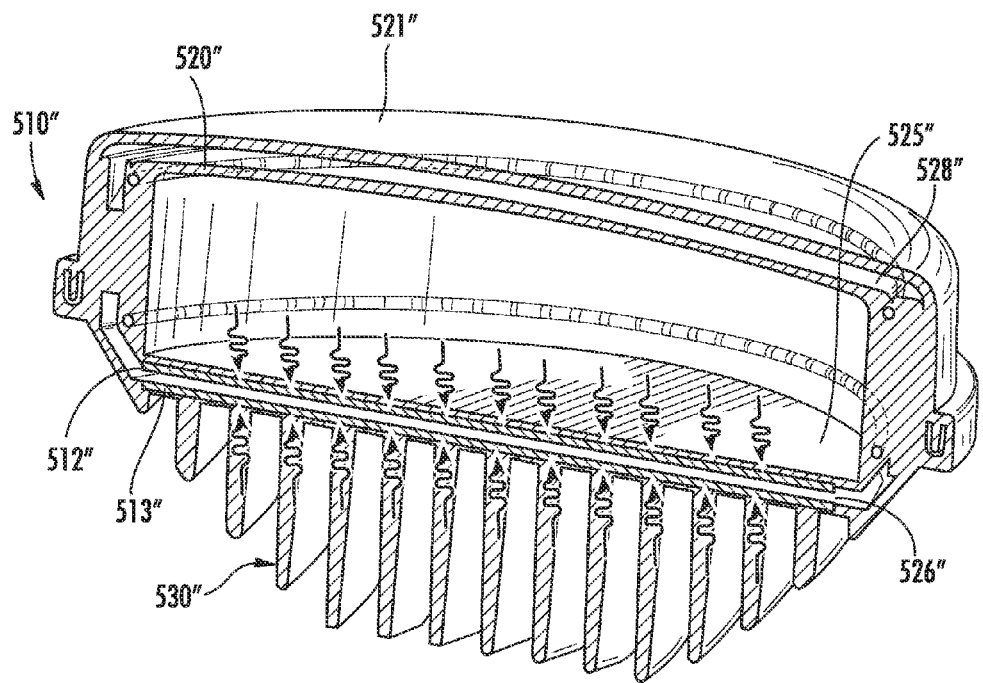

FIGS. 8a, 8b, and 8c are cross-sectional view of a mechanism 510 for reducing water based contamination from a headlamp assembly 10 including a solid state heat pump 512. FIG. 8a illustrates mechanism 510 with a single lens 521. Heat sources, including light emitting diodes and a circuit board 525 are also provided. In the embodiment of FIG. 8a, heat is transferred by way of solid state heat pump 512. As discussed above, heat pump 512 transfers heat from a heat sink 530 towards circuit board 525. Thus, heat from heat sources, including circuit board 525 is directed towards lens 521 to heat lens 521 for reducing water based contamination from a headlamp assembly 10.

The embodiment shown in FIG. 8b is also a mechanism 510' for reducing water based contamination from a lens, wherein a heat pump 512' is employed. Mechanism 510' includes inner lens 520' and outer lens 521'. As discussed with respect to FIG. 5, heat generated by light emitting diodes and associated circuitry on circuit board 525' is transferred to a channel 526' via a convection process. A channel 528' for transferring fluid is also located between inner and outer lenses 520' and 521'. Heat sources, including light emitting diodes and a circuit board 525' are also provided. In the embodiment of FIG. 8b, a solid state heat pump 512' is positioned below circuit board 525' and acts to draw heat from circuit board 525' and the light emitting diodes. The heat is then transferred to from heat pump 512' to channel 528' to heat the fluid within the channel. The heated fluid then travels up channels formed in the sides of mechanism to channel 528. The heated air may then heat lens 521 for reducing water based contamination from a headlamp assembly 10. Transferring heat away from circuit board 525' and light emitting diodes also reduces the temperature of the circuit elements and light emitting diodes, thereby preventing degradation due to heat.

FIG. 8c depicts a mechanism 510" for reducing water based contamination from a lens, wherein a first heat pump 512" and a second heat pump 513" employed. Mechanism 510" includes inner lens 520" and outer lens 521". Heat generated by light emitting diodes and associated circuitry on circuit board 525' is transferred to a channel 526" via a convection process. A channel 528" for transferring fluid is also located between inner and outer lenses 520" and 521". First solid state heat pump 512" is positioned below circuit board 525" and acts to draw heat from circuit board 525" and the light emitting diodes. The heat is then transferred to from heat pump 512" to channel 526" to heat the fluid within the channel. In addition, a second heat pump 513" is positioned adjacent to heat sink 530" for transferring heat from heat sink 530" towards channel 526". The heated fluid then travels up channels formed in the sides of mechanism 510" to channel 528". The heated air may then heat lens 521 for reducing water based contamination from a headlamp assembly 10.

Figure 9A:
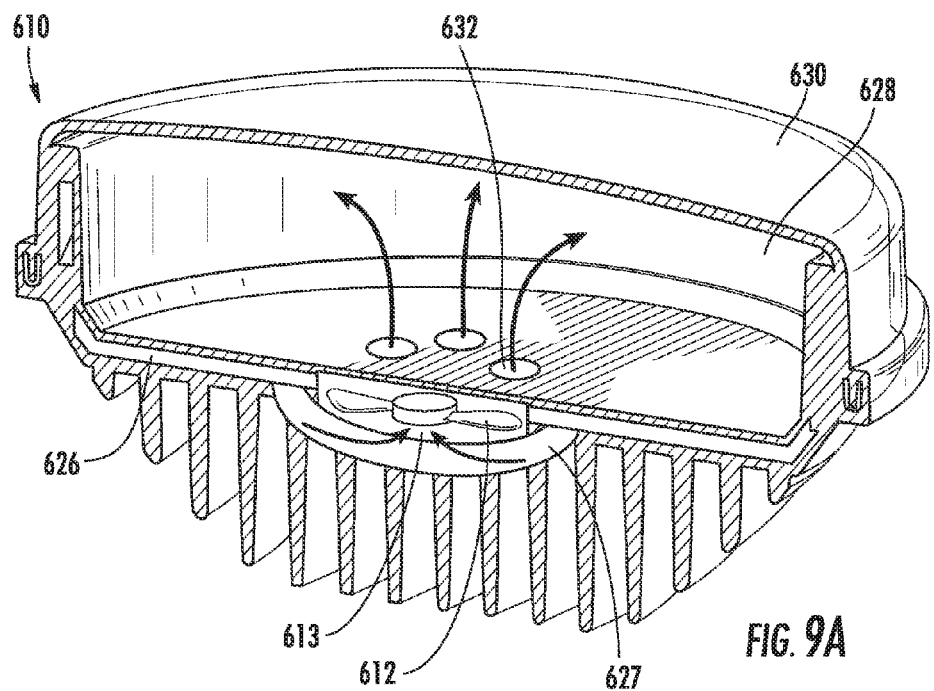
FIGS. 9a and 9b represent alternative embodiments of a mechanism for reducing water based contamination from a headlamp assembly utilizing a single lens structure.
Figure 9B:
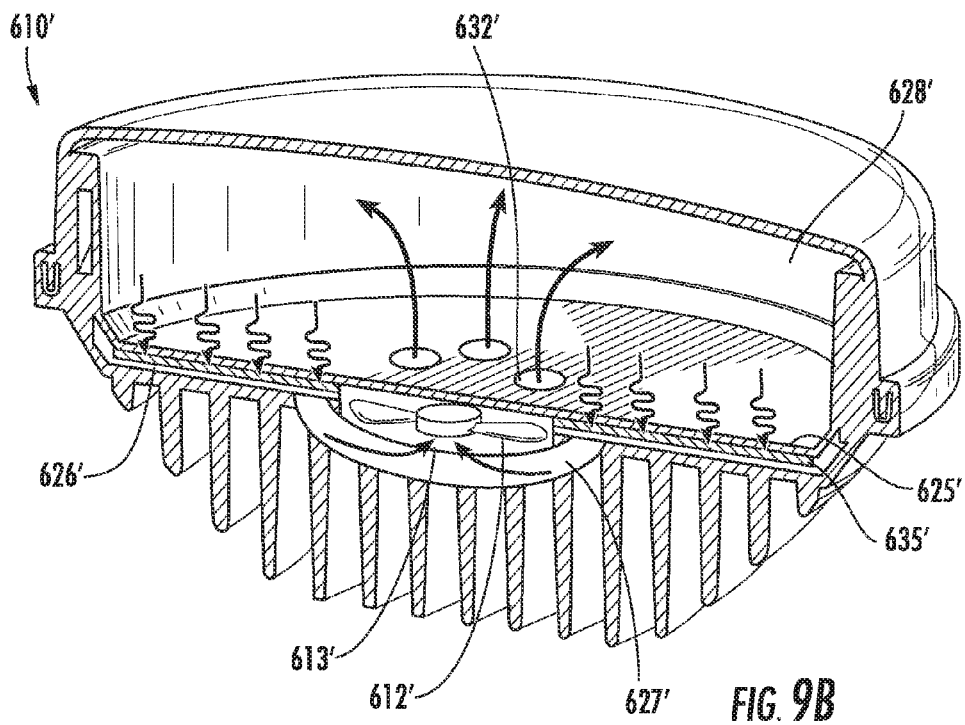

FIGS. 9a and 9b represent alternative embodiments of a mechanism 610, 610' for reducing water based contamination from a headlamp assembly 10 utilizing a single lens structure. As shown, a device that moves air, such as a fan or air pump, 612, 612', is positioned in a compartment 613, 613', below circuit board 625, 625' and in close proximity to a channel 626, 626'. Heat from circuit board 625, 625' is drawn into channel 626, 626' and through passages 627, 627' toward compartment 613, 613'. Fan, 612, 612' acts to force the air into a chamber 628, 628' within mechanism 610,610' to circulate in order to prevent warm air from becoming trapped in one particular area. Warm air radiating from the Light emitting diodes and circuit board 625, 625' rises up to lens 630, 630'. If snow or ice has accumulated on lens 630, 630', this heat will aid in melting the snow and/or ice. If, however, the temperature of lens 630, 630', is the same or warmer than the air inside chamber 628, 628', heat will tend to build up in the area below lens 630, 630' and above circuit board 625, 625' causing a risk to the Light emitting diodes and other circuitry. Fan 612, 612' pulls cooler, more dense air, which naturally migrates toward the bottom portion of the headlamp, up to the portion between lens 630, 630' and circuit board 625, 625', thus facilitating a replacement of warmer air trapped within the this area. As shown, one or more holes 632, 632' may be provided in circuit board 625, 625' to facilitate transfer of air from the bottom portion of mechanism 610, 610', through holes 632, 632' and into chamber 628, 628', thereby circulating air throughout mechanism 610, 610', and particularly circulating warm air generated by the Light emitting diodes and circuitry to facilitate reducing water based contamination from a headlamp assembly 10. The embodiment of FIG. 9b includes a solid state heat pump or thermal slug 635 to further included to assist in reducing water based contamination from a headlamp assembly 10. Heat pump 635 draws heat from circuit board 625' and light emitting diodes down into a channel 626' where the heat is transferred, via fan 612', to air within channel 628' in the manner described above.

As illustrated in each of FIGS. 10-13 a resistive heating element may be embedded the outer lens of any of the previously discussed embodiments. With respect to FIG. 10, a mechanism 710 for reducing water based contamination from a headlamp assembly 10 is shown with resistive heating element 712. Heating element 712 is powered by circuit board 725 and provides heat to lens 730 when snow and ice accumulate on the lens, to thereby clear the lens from water-based contamination which can act as a filter decreasing transmittance of light through lens 730.

Figure 10:
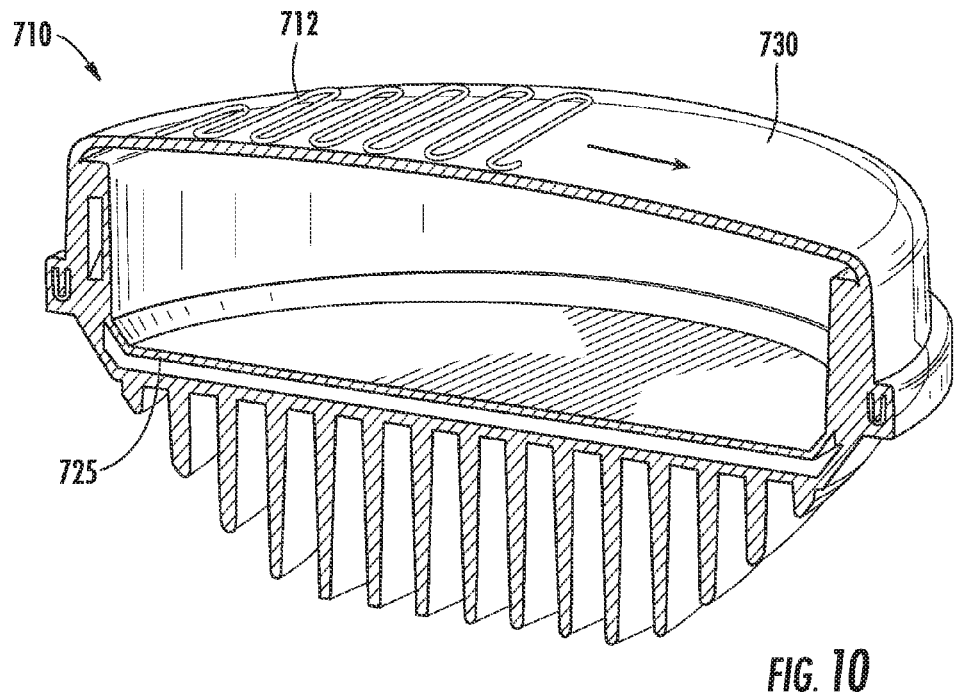
FIGS. 10-13 illustrates embodiments of a mechanism for reducing water based contamination from a headlamp assembly including resistive heating elements embedded the outer lens.
Figure 11:
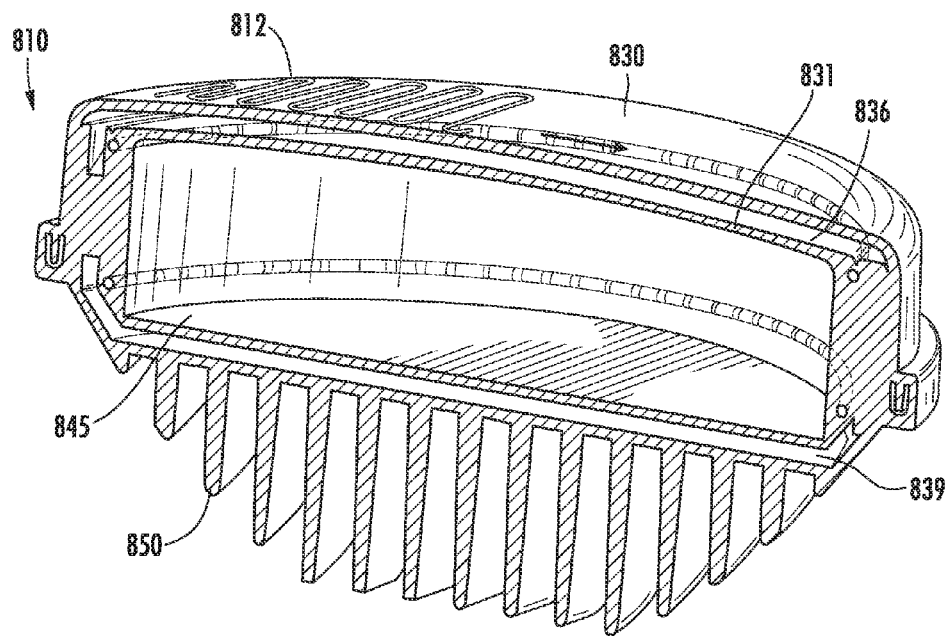

FIG. 11 illustrates an alternative embodiment to that disclosed in FIG. 10. A mechanism 810 for reducing water based contamination from a headlamp assembly 10 is shown with resistive heating element 812 embedded in an outer lens 830. An inner lens 831 is also shown with a channel 836 formed therebetween. Fluid within channel 836 flows through side channels and through channel 839, which is formed between circuit board 845 and heat sink 850. Once heated, resistive heating element 812 provides heat to outer lens 830 in order to facilitate the removal of water-based contamination such as snow and ice from the outer lens. In addition, resistive heating element 812 provides a means of promoting circulation of fluid within channels 836 and 839 by transfer of heat to the fluid causing the molecules of the fluid to move rapidly to thereby increase flow of fluid.

Figure 12:
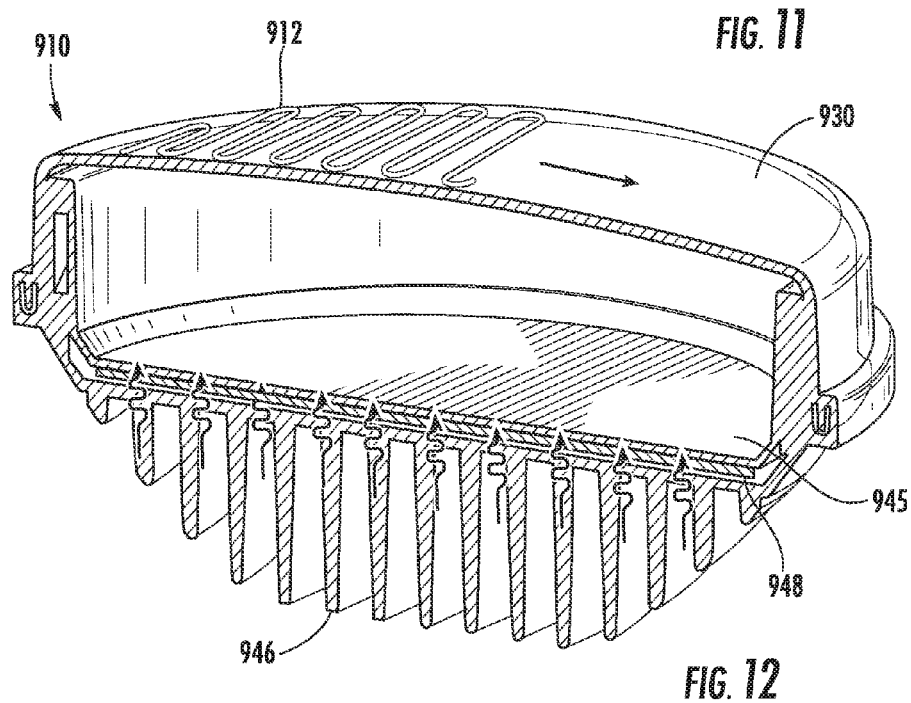

FIG. 12 represents a modified version of the embodiment disclosed in FIG. 10. A mechanism 910 for reducing water based contamination from a headlamp assembly 10 is shown with resistive heating element 912 embedded in a single lens 930. The resistive heating element 912 is powered by circuit board 945 and provides heat to lens 930 when snow and ice accumulate on the lens, to thereby clear the lens from water-based contamination which can act as a filter decreasing transmittance of light through lens 930.

In addition, as shown by the arrows, warm air originating from Light emitting diodes and circuit board 945 and associated circuitry is transferred to lens 930 via heat pump 948. Heat from heat sink 946 is also transferred toward lens 930. Thus, lens 930 is provided with heat both by a resistive heating element 912 as well as transfer of heat radiating from the Light emitting diodes and circuit board 945 by way of heat pump 948. This creates a two-fold advantage, in that water-based contamination is melted from lens 930 thereby increasing optical transmittance, and heat is reduced in the area of the Light emitting diodes and associated circuitry thereby extending the useful life of the headlamp. Heat pump operates in the manner described in relation to FIG. 8a.

Figure 13:
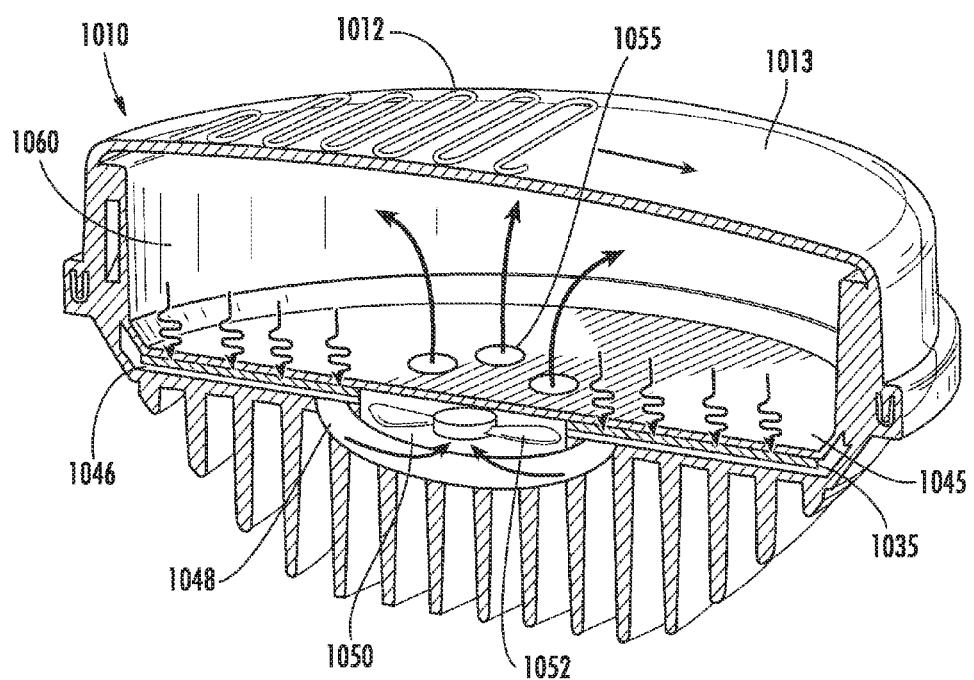

The embodiment shown in FIG. 13 is a mechanism 1010 for reducing water based contamination from a headlamp assembly 10 is shown with resistive heating element 1012 embedded in a lens 1013. As described with respect to the embodiment of FIG. 9b, mechanism 1010 includes a solid state heat pump or thermal slug 1035 to further assist in reducing water based contamination from a headlamp assembly 10. Heat pump 1035 draws heat from circuit board 1045 and light emitting diodes down into a channel 1046 where the heat is transferred through passages 1048 to chamber 1050. A fan 1052 directs air through openings 1055 and into chamber 1060 towards lens 1013 in the manner described above.

A control system may be utilized in any one of the embodiments discussed supra. The system includes temperature sensor which monitors the temperature in and around the lens structure. Sensor 520 may comprise a Resistive Temperature Detector (RTD), Positive Temperature Coefficient Thermistor (PTC), or any other type of temperature sensor known in the art including variable resistors, thermistors, bimetal circuits, bimetal switches, as well as linear and switch mode current regulators. The temperature read by the sensor is converted to a signal and transferred to a comparator. The Comparator compares the actual temperature reading to a threshold temperature value stored within the device. If the actual temperature is below the threshold value, the comparator sends a signal to a switch in order to activate the heating element, thermal transfer fluid circulating device, or Peltier heat pump to thereby heat the dual or single lens structure in order to melt water-based contamination accumulating on the LED lamp. Similarly, when the actual temperature read by the sensor is above the threshold temperature value, comparator will send a signal to the switch in order to deactivate heating element, thermal transfer fluid circulating device, or Peltier heat pump and heat will thus be stored by the heat sink and eventually exhausted to the atmosphere if necessary via fins.

It will be understood by those skilled in the art that the above disclosure is not limited to the embodiments discussed herein and that other methods of controlling heating element, thermal transfer fluid circulating device, or Peltier heat pump may be utilized. These methods may include manual activation and deactivation of heating element, thermal transfer fluid circulating device, or Peltier device via an on/off switch. Other alternative embodiments include continuous activation of the elements so that LED lamp temperature is high enough to prevent accumulation of water-based contamination but low enough to prevent inadvertent thermal deterioration of the LED lamp and its components.

I claim:

1. A lens assembly for reducing water based contamination in a headlamp assembly comprising:
    an outer lens layer having an inner surface and an outer surface;
    a first adhesive layer disposed on top of the inner surface of the outer lens layer;
    a heating element, comprised of a plurality of loops of wire capable of being resistively heated upon application of an electrical current to the wire, said heating element disposed on top of the first adhesive layer;
    a second adhesive layer, disposed on top of the heating element;
    an inner lens layer having in inner surface and an outer surface, wherein the outer surface of the inner lens layer is in contact with the second adhesive layer;
    wherein the first and second adhesive layers bond the outer lens layer, the heating element and the inner lens layer to form a composite structure; and
    wherein the adhesive used in the first and second adhesive layers has an appropriate index of refraction to allow the composite structure to function as a lens.

2. The lens assembly of claim 1 wherein at least two of the plurality of loops of wire in the heating element are connected in parallel.

3. The lens assembly of claim 1 wherein at least two of the plurality of loops of wire in the heating element are connected in series.

4. The lens assembly of claim 1 wherein the inner surface of the inner lens layer has optical surfaces disposed thereon.

5. The lens assembly of claim 1, wherein the inner and outer lens layers are formed from a material selected from the group consisting of polycarbonate and glass.

6. A lamp assembly comprising:
- a housing;
- a lens assembly secured to the housing, and defining an interior thereof, said lens assembly further comprising:
- an outer lens layer having an inner surface and an outer surface;
- a first adhesive layer disposed on top of the inner surface of the outer lens layer;
- a heating element, disposed on top of the first adhesive layer;
- a second adhesive layer, disposed on top of the heating element;
- an inner lens layer having in inner surface and an outer surface, wherein the outer surface of the inner lens layer is in contact with the second adhesive layer, and wherein the first and second adhesive layers bond the outer lens layer, the heating element and the inner lens layer to form a composite structure;
- a circuit board disposed within the interior of the housing;
- a plurality of light emitting diodes, disposed upon the circuit board and configured to emit light through the lens assembly;
- and a control system for activating the heating element when the lamp is exposed to an ambient temperature within a range of temperatures at which water based contamination occurs.

7. The lamp assembly of claim 6, wherein the control system further comprises a comparator that selectively activates and deactivates the heating element based on a resistance value of the heating element, wherein the resistance value is compared to a set value that is associated with the maximum temperature of the range wherein water based contamination may occur.

8. The lamp assembly of claim 6, wherein the adhesive used in the first and second adhesive layers has an appropriate index of refraction to allow the composite structure to function as a lens.

9. The lamp assembly of claim 6, wherein the heating element is adapted for use with an input voltage in the range of 12 to 24 V.

10. A lamp assembly comprising:
- a housing;
- a lens assembly secured to the housing, and defining an interior thereof;
- a circuit board disposed within the interior of the housing;
- a plurality of light emitting diodes, disposed upon the circuit board and configured to emit light through the lens assembly;
- an optically clear heat transfer fluid, disposed within the interior of the housing;
- a circulation system adapted for circulating the heat transfer fluid between the plurality of light emitting diode and the lens assembly, wherein heat produced by the light emitting diodes is transferred by the heat transfer fluid to the lens assembly;
- and a control system for activating the circulation system when the lamp is exposed to an ambient temperature within a range of temperatures at which water based contamination occurs.

* * * * *